United States Patent [19]

Linder et al.

[11] Patent Number: 5,265,734

[45] Date of Patent: Nov. 30, 1993

[54] SILICON-DERIVED SOLVENT STABLE MEMBRANES

[75] Inventors: Charles Linder, Rehovot; Mara Nemas, Neve Monosson; Mordechai Perry, Petach Tikva; Reuven Katraro, Rishon Lezion, all of Israel

[73] Assignee: Membrane Products Kiryat Weitzman Ltd., Rehovot, Israel

[21] Appl. No.: 986,753

[22] Filed: Dec. 8, 1992

Related U.S. Application Data

[63] Continuation of Ser. No. 929,464, Aug. 13, 1992, which is a continuation of Ser. No. 752,847, Aug. 30, 1991.

[51] Int. Cl.$^5$ ..................... B01D 61/02; B01D 61/14
[52] U.S. Cl. .............................. 210/654; 210/500.27
[58] Field of Search ................ 210/634, 644, 649–654; 210/500.27, 500.43

[56] References Cited

U.S. PATENT DOCUMENTS

| | | |
|---|---|---|
| 3,556,305 | 1/1971 | Shorr . |
| 3,567,810 | 3/1971 | Baker . |
| 3,615,024 | 10/1971 | Michaels . |
| 4,029,582 | 6/1977 | Ishii . |
| 4,125,462 | 11/1978 | Latty . |
| 4,188,354 | 10/1978 | Harada et al. . |
| 4,230,463 | 10/1980 | Henis et al. . |
| 4,243,701 | 1/1981 | Riley et al. . |
| 4,468,500 | 8/1984 | Malon et al. . |
| 4,468,501 | 8/1984 | Zampini et al. . |
| 4,468,502 | 8/1984 | Malon et al. . |
| 4,477,634 | 10/1984 | Linder et al. . |
| 4,553,983 | 11/1985 | Baker . |
| 4,690,765 | 9/1987 | Linder et al. . |
| 4,690,766 | 9/1987 | Linder et al. . |
| 4,704,324 | 11/1987 | Davis et al. . |
| 4,778,596 | 10/1988 | Linder et al. . |
| 4,855,048 | 8/1989 | Tang et al. . |
| 4,902,422 | 2/1990 | Pinnau et al. . |
| 4,909,989 | 3/1990 | Fukazawa et al. . |
| 4,950,314 | 8/1990 | Yamada et al. . |

FOREIGN PATENT DOCUMENTS

| | | |
|---|---|---|
| 0008945 | 3/1980 | European Pat. Off. . |
| 0041839 | 12/1981 | European Pat. Off. . |
| 0099432 | 2/1984 | European Pat. Off. . |
| 0130963 | 1/1985 | European Pat. Off. . |
| 0214792 | 3/1987 | European Pat. Off. . |
| 2027614 | 5/1978 | United Kingdom . |
| 2000720 | 1/1979 | United Kingdom . |
| 1558607 | 1/1980 | United Kingdom . |

OTHER PUBLICATIONS

Ward et al. J. Memb. Sci. 1976, 1:99–108.
Baker et al., J. Memb. Sci. 1987, 31: 259–271
Strathmann et al., Desalination, 1975, 16, 179.
Sourirajan, S. (ed.) Reverse Osmosis and Synthetic Membranes, National Research Council Canada Publications, Ottawa, Canada, 1977.
Murari et al. J. Memb. Sci., 16: 121–135 and 181–193, 1983.
Office of Saline Water R&D Progress Report No. 357, Oct. 1967.
Kimmerle et al., J. Memb. Sci, 1988, 36: 477–488.
Rozelle et al., "Development of New Reverse Osmosis Membranes for Desalination"; Research & Development Progress Report No. 359, Oct. 1968, pp. 1–60.

*Primary Examiner*—Frank Sever
*Attorney, Agent, or Firm*—Ladas & Parry

[57] ABSTRACT

A composite membrane comprises a substrate made from a polymer selected from copolymers and homopolymers of ethylenically unsaturated nitriles, which substrate has preferably first been treated with a pore protector in absence of curing agents and catalysts therefor, prior to applying as the final coating a silicone layer, which is crosslinked. The pore protector, which may be, for example, a hydroxy-terminated polysiloxane, particularly a silanol-terminated polysiloxane, serves the dual purpose of preventing the pores from collapsing, when the support is dried during the curing of the silicone layer, and of preventing passage of the coating material deeply into the pores and thus also preventing an undue reduction of the flux of the finished coated membrane. Such composite membranes include solvent stable membranes which swell to an extent of no more than about 10% when immersed in various organic solvents, and their mixtures with each other and/or water.

37 Claims, No Drawings

SILICON-DERIVED SOLVENT STABLE MEMBRANES

This is a continuation of copending application Ser. No. 07/929,464 filed Aug. 13, 1992 pending, which is a continuation of application Ser. No. 07/752,847 filed Aug. 30, 1991 pending.

FIELD AND BACKGROUND OF THE INVENTION

The present invention relates to silicone-derived solvent stable membranes. Nicrofiltration (MF), Reverse Osmosis (RO) and Ultrafiltration (UF) membranes are often made from polymers, which swell and dissolve in organic solvents. Such polymeric membranes may dissolve in different solvents, but generally the best solvents for dissolving the polymers are dimethylformamide (DMF), N-methylpyrrolidone (NMP), dimethylsulfoxide (DMSO), hexamethyl phosphoramide, sulfolane (tetramethylene sulfone) and N,N-dimethylacetamide.

There are many potential membrane applications which could usefully employ solvent stable membranes. Such applications are e.g. in the areas of food technology, biotechnology, the treatment of waste streams, chemical manufacturing and petrochemicals. These solvent stable membranes are desirably also swelling resistant, because swelling of such membranes under pressure would indicate solvent/membrane interaction and thus polymer chain mobility, which usually results in compaction, and loss of flux and of performance generally, under pressure. A particular advantage of such solvent stable membranes would be, that they could be exposed to a variety of solvent media including aqueous solutions, suspensions or emulsions, as well as to organic solvents which contain solutes.

There are presently available solvent stable membranes in the form of ceramics or other inorganic materials and specialized crosslinked polymers. These, however, are expensive, difficult to prepare, brittle, cannot be made conveniently with the desired molecular weight cutoffs, and in practice are restricted to certain configurations. Besides ceramics, there are available membranes from crosslinked polymers such as epoxy polyimide type polymers, as well as and encapsulated polymers. Encapsulated polymers are described in U.S. Pat. No. 4,778,596; the membranes are coated on the external surfaces and on the internal pore surfaces with an aqueous polymer which is then crosslinked. The support membrane is not crosslinked, but encapsulated in an outer skin; such membranes swell but do not dissolve, upon immersion in organic solvents. Crosslinked polyimide commercialized by NITTO (Japan) have some solvent resistance but limited pH/temperature stability; in addition, the membranes are limited to the UF range with low efficiency in operation.

Other organic polymers (polysulfones, polyamides and cellulose acetate) may be cast into similar membranes, of different configurations, but they are difficult to insolubilize, and may swell after insolubilization. Many new organic polymers, in addition to the abovementioned polyimides e.g. (polyetherketones, polytriazoles, perfluoropolymers such as perfluorodioxolanes) may be cast from esoteric or difficult-to-handle solvents and demonstrate insolubility in many solvents, but they still swell in many of these solvents, and even dissolve in some others. Even after cross-linking, the degree of swelling may not be reduced below 10%.

Silicone composites are known. Thus, U.S. Pat. No. 4,243,701 (Riley) discloses thin films of dimethylsilicone on various supports, particularly polysulfones. These membranes are designed mostly for gas separation. Other gas separation membranes using silicone layers are described in U.S. Pat. No. 4,230,463 (Henis et al, use of polydimethylsiloxane); Ward et al, J. Membr. Sci., 1976, 1: 99–108 (use of ultra thin silicone polycarbonate); U.S. Pat. No. 4,950,314 (Shinichi et al, use of polyolefins and polyarylene oxides containing active silyl groups which crosslink the thin coating through oligosiloxane bonds of 1-3 units); EP 0214792A (Cabasso et al, use of derivatives of aminopolysiloxanes with brominated derivatives of polyphenylene oxide); EP 0041839A (Sugie et al, use of silicone-containing copolymers); EP 0099432A (Hirose, use of silarylene-siloxane polymers). Also, the use of a methyl terminated polysiloxane as drying agent for cellulose acetate has been described in U.S. Pat. No. 4,855,048. The entire disclosures of all these patents and publications are explicitly incorporated herein by reference. While in the context of the present invention, the issue of solvent stable substrates is of primary importance, this is not the case in the context of the mentioned references.

Baker et al, in U.S. Pat. No. 4,553,983 and J. Membr. Sci., 1987, 31: 259–271, describe thin polydimethylsiloxane films of 0.1 to 10 micron thickness, on polyimide and polysulfone supports. These supports are described as solvent resistant, and the polyimide membrane is described as crosslinked polyimide. In reality, these membranes swell extensively in many solvents and from a practical viewpoint could not be regarded in general, as solvent stable composites. Other membranes useful for supports according to Baker are to be found in Strathmann et al, in Desalination, 1975, 16: 179; these are solvent resistant and will not dissolve in many solvents, but they will swell beyond 10% in many of the same solvents. Kimmerle et al, in J. Membr. Sci., 1988, 36: 477–488, describe polysulfone hollow fibers coated internally with a thin layer of dimethylpolysiloxane. These, and the membranes described by Baker are designed for removal of organic solvents from air, gas, and aqueous waste streams. For aqueous/solvent streams, the process is "pervaporation". The silicone layers of all of these membranes are cured and crosslinked by well-known techniques. The disclosures of these patents and publications are incorporated by reference herein. Solvent stable acrylonitrile-derived substrates are described in allowed U.S. Pat. No. 07/415,156, the entire contents of which are incorporated herein by reference.

The silicones useful in the present invention are optionally silanol-terminated polymers and prepolymers, including aliphatic and aromatic polysiloxanes, both mono- and di-substituted, containing aliphatic or alicyclic groups such as lower alkyl ($C_1$-$C_6$), e.g. methyl, ethyl and propyl, cycloalkyl ($C_3$-$C_8$), lower alkoxy ($C_1$-$C_6$), $C_6$-$C_{12}$ carbocyclic aryl or aryloxy such as phenyl, naphthyl, phenoxy or naphthoxy, or $C_1$-$C_6$ alkanoyl or alkanoyloxy such as acetyl or acetoxy, or $C_7$-$C_{13}$ carbocyclic acyl or acyloxy such as benzoyl, naphthoyl, benzoyloxy or naphthoyloxy. However, for the pore-protecting intermediate layer, silanol-terminated silicones are utilized.

The silicones, when used for the outer layer of the composites of the invention, may be crosslinked in the presence of a crosslinking agent and/or a crosslinkable comonomer such as methylstyrene. Typical crosslinking agents when olefinic bonds are present in the silicones are organic and inorganic peroxides. On the other hand, silanol-containing or -terminated siloxane polymers can be crosslinked with an alkoxysilane such as a tetraalkoxysilane, trialkoxysilane or polyalkoxysiloxane. Silanol-terminated polymers may also be cured by polysiloxanes containing silanic hydrogen. By a suitable choice of catalyst, cure may be effected at room temperature in times ranging from 1.0 minutes to 42 hours. Presently preferred catalysts are stannous octoate, and dibutyltin dilaurate. Other catalysts are dibutyltin dioctanoate, dibutyltin diacetate, salts of carboxylic acids such as iron 2-ethylhexanoate and cobalt naphthenate, titanic acid esters, and amines such as ethylamine, dibutylamine and pyridine.

A presently preferred silicone for use as the outer layer of the present composites is a crosslinked polydimethylsiloxane, which may example be prepared from a silanol-terminated prepolymer and a crosslinking agent which may be e.g. a silane or a siloxane crosslinking agent having four or more functional groups. A single coating solution can contain silanol-terminated polysiloxane, crosslinking agent and catalyst. These and other methods are described in the above mentioned U.S. Pat. No. 4,950,314. One preferred combination is silanol-terminated dimethylsiloxane (MW 36,000) with tetraethoxysilane and dibutyltin dilaurate, coated onto a substrate (previously treated with pore protector) from an aliphatic hydrocarbon solvent such as hexane, or from perfluoro solvents.

Commercially available polysiloxanes have molecular weights between 1000 and 300,000, although the invention is not limited to this range. The silicone polymer may be applied to the pore-protected support in many different ways known in the art of coating thin films onto porous supports. Such methods are described in previously mentioned U.S. Pat. Nos. 4,243,701, 4,230,463, and 4,950,314 and in J. Membr. Sci., 1976, 1:99. One presently preferred and relatively simple method is dipping the pore-protected substrate into a solution of silicone polymer or prepolymer, draining and curing. The concentration of silicone in such solution may vary from 0.01 to 10%, but is preferably in the range of 0.1 to 2%, for both the pore-protecting step and the final coating step. The concentration of the crosslinker may vary between 0.05 and 10%, preferably 0.1 and 5%. The solvents for the final silicone coating may be e.g. aliphatic hydrocarbons or perfluoro solvents and for the pore protector, e.g., lower (e.g. $C_1$ to $C_4$) alcohols; or the same solvent could be used for both the pore protecting step and for the final coating step.

The composite membranes of the invention find application, e.g., for the concentration and purification of organic solutes, such as dyes, dye intermediates, optical brighteners, antibiotics, peptides, proteins, enzymes, hormones, & herbicides, in organic solvents or in aqueous/organic mixtures.

Moreover, liquid streams which can be treated by means of solvent stable membranes of the invention include also:

(i) Lubricating oils, which are in particular low NW components having a MW cut off in the range of 300-2000 Daltons, and which are dissolved in strong organic solvents such as NMP, phenol, MEK, MIBK, toluene and their mixtures. Their separation requires availability of solvent stable membranes which will be stable in solvents such as those specified, and which will retain the dissolved low MW oils to a sufficient degree, e.g. between 70-95%. Thus, merely by way of example only, a solution of 10-15% paraffins oil dissolved in a 1:1 MEK/MIBK mixture may be separated into a stream containing a twofold concentration of oil and a stream containing only 10% of the original concentration.

(ii) Catalyst dissolved in organic solvents. Several catalysts comprising metal organic complexes are in commercial use for performing catalytically enhanced polymerization reactions in organic media. These catalysts are very expensive and there is great interest in recovering them from reaction mixtures. The molecular weight of the catalyst may vary from 200-300 and up to 2000-3000 Daltons.

(iii) Low MW oligomers in paint wastes dissolved in strong organic solvents such as MEX, butyl acetate and/or other strong solvents singly or in admixture.

SUMMARY OF THE INVENTION

It is an object of the present invention to provide membranes which do not dissolve in organic solvents, and also do not swell more than about 10% in such solvents, or in admixtures of water with such solvents. Another object of the invention is to provide such membranes which are oxidation resistant, solvent resistant, and have a broad temperature stability. Still another object of the invention is to provide such membranes with a broad range of molecular weight cut-off limits. A further object of the invention is to provide such membranes which are relatively economical to manufacture and which can be made in a multiplicity of useful shapes. Other objects of the invention will appear from the following description.

The present invention accordingly provides a composite membrane, in which the underlying substrate membrane is a porous substrate, such as a microfiltration (MF), ultrafiltration (UF) or Reverse Osmosis (RO) membrane, the substrate being made from a polymer, selected from copolymers and homopolymers of ethylenically unsaturated nitriles, which substrate has preferably first been treated with a pore protector in absence of a curing agent, prior to coating with a silicone layer which is crosslinked. The pore protector, which may be, for example, a hydroxy-terminated polysiloxane (used for this purpose in absence of curing agents or catalysts), serves the dual purpose of preventing the pores from collapsing, when the support is dried during the curing of the silicone layer, and of preventing passage of the coating material deeply into the pores and thus also preventing an undue reduction of the flux of the finished coated membrane. Treatment with the pore protector may be carried out, for example, by dipping the membrane into a dilute solution of the pore protector in a low-boiling inert solvent, e.g. a low boiling alcohol having 1–4 carbon atoms, such as methanol, ethanol, propanol or butanol. The final silicone coating and the pore-protecting silicone layer should desirably have a thickness in the range of from 500 to 5000 Å, more preferably in the range from 1000 to 2000 Å.

As previously mentioned, the composite membranes of the invention find application, e.g., for the concentration and purification of organic solutes, such as antibiotics, peptides, proteins, enzymes, hormones, herbicides, dyes and dye intermediates and optical brighteners, in organic solvents or in aqueous/organic mixtures. Other potential applications are, the separation of at least one inorganic salt from at least one organic compound e.g. of molecular weight in the range 150-2000, for example in the range of from about 150 to about 1500 (preferably from about 150 to about 1000, more preferably from about 150 to about 300), in aqueous media. Yet other potential applications are, the separation from aqueous media of monosaccharides, disaccharides or polysaccharides; the separation of insoluble particles, colloidal particles, soluble polymers and other solute molecules from an organic solvent, e.g. from acetonitrile, alcohols e.g. ethanol, ethers, esters, hydrocarbons such as hexane or toluene, dimethylformamide, dimethylacetamide, N-methylpyrrolidone or dimethyl sulfoxide, and mixtures of these with each other and/or water; and the concentration of organic or inorganic solutes from aqueous streams, water/organic solvent mixtures, or organic solvents alone. Thus the term "separation" in the present specification and claims is to be understood as including "concentration", where the context permits. It is believed that the present composites may also find utility in the separation of undesired solute molecules from juices and other extracts of fruit and vegetable origin.

DETAILED DESCRIPTION OF THE INVENTION

The substrate membrane may be supported on a porous support, such as, for example, one fabricated from a member selected from non-woven and woven cellulosics, polyethylene, polypropylene, nylon, vinyl chloride homo- and co-polymers, polystyrene, polyesters such as polyethylene terephthalate, polyvinylidene fluoride, polytetrafluoroethylene, glass fibers, porous carbon, graphite, inorganic supports based on alumina and/or silica, and such inorganic supports coated with zirconium oxides. Whether supported or not, the substrate membrane may be formed into any desired shape, e.g. a hollow fiber or tubelet, or it may be planar.

In an embodiment of the invention, polyacrylonitrile, insolubilized and crosslinked as will be described infra, may be used as the polymer of which the underlying substrate is comprised. Such membranes based on polyacrylonitrile afford stability to solvents, pH and temperature, over a wide range of pore sizes. They tend to be more stable to a wider variety of solvents. The polyacrylonitrile membranes may be subjected to the steps of immersion in, or exposure to, reagents, and/or heating; as e.g., treatment with base (organic or inorganic) and heating. The conditions for treatment must be chosen so as not to destroy the structure. Tightening of the membrane may occur, but this would allow improvement in cutoffs. If excessive tightening does occur, then one may initially choose a more open membrane.

Casting of the substrate membrane, comprised of acrylonitrile-derived polymers, may be performed by any number of casting procedures cited in the literature, for example U.S. Pat. Nos. 3,556,305, 3,567,810, 3,615,024, 4,029,582 and 4,188,354; GB 2,000,720; Office of Saline Water R & D Progress Report No. 357, October 1967; Reverse Osmosis and Synthetic Membranes, Ed. Sourirajan; Murari et al, J. Membr. Sci. 16: 121-135 and 181-193 (1983). Thus, the polymer or its derivatives may be dissolved in a suitable solvent or solvent mixture (e.g. NMP, DMF, DMSO, hexamethylphosphoramide, N,N-dimethylacetamide, dioxane), which may or may not contain cosolvents, partial solvents, nonsolvents, salts, surfactants or electrolytes, for altering or modifying the membrane morphology and its flux and rejection properties (e.g. acetone, ethanol, methanol, formamide, water, methyl ethyl ketone, triethyl phosphate, sulfuric acid, HCl, partial esters of fatty acids and sugar alcohols, or their ethylene oxide adducts, sodium dodecyl sulfate, sodium dodecylbenzene sulfonate, NaOH, KCl, zinc chloride, calcium chloride, lithium nitrate, LiCl, magnesium perchlorate, etc.).

The casting solution may be filtered by any of the known processes (e.g. pressure filtration through microporous filters, or by centrifugation), and cast on a support such as glass, metal, paper, plastic, etc., from which it may then be removed. It is preferred, however, to cast onto a porous base support from which the membrane is not removed. Such porous base supports may be non-woven, or woven, including cellulosics, polyethylene, polypropylene, nylon, vinyl chloride homo- and co-polymers, polystyrene, polyesters such as polyethylene terephthalate, polyvinylidene fluoride, polytetrafluoroethylene, polysulfones, polyether sulfones, poly-ether ketones, polyphenylene oxide, glass fibers, porous carbon, graphite, inorganic membranes based on alumina and/or silica (possibly coated with zirconium and/or other oxides). The membrane may otherwise be formed as a hollow fiber or tubelet, not requiring a support for practical use; or the support may be of such shape, and the membrane is cast internally thereon.

The concentration of polymer in the casting solution may vary as a function of its MW and additives, and may be for example, within the range of about 5-80%, preferably about 10-50%, most preferably about 15-30%. The casting temperature may vary from about $-20°$ to about 100° C., preferably about 0° to 60° C., depending on the particular polymer, its molecular weight and the cosolvents and additives in the casting solution.

The casting solution may be applied to the above-mentioned supports by any of the well-known techniques (such as dipping, spraying or other surface contact) which are familiar to those skilled in the art. The wet film thickness may lie within the range of about 15 microns to about 5 mm., preferably about 50 to about 800 microns, most preferably about 100 to about 500 microns for flat membranes; tubelets may of course have thicker walls. The wet supported film may be immersed immediately, or after a partial drying step (of from about 5 secs. to about 48 hours, under ambient conditions or elevated temperature and/or under vacuum), in a gelling bath of a non-solvent. Such baths generally comprise water, to which there may optionally be added a small percentage of a solvent (e.g. DMF or NMP) and/or surfactant (e.g. sodium dodecyl sulfate), at a temperature within the range of about 0° to about 70° C. An example of a widely used gelling bath is water with 0.5% sodium dodecyl sulfate at 4° C. In another mode of forming membranes, a polymer solution containing a component which may be leached out in water or other solvent, is cast and dried prior to immersion; the subsequent immersion step removes leachable material, resulting in a porous membrane. In a third variation, a polymer solution without any leachable materials is cast and taken to dryness, resulting in a porous membrane by virtue of the physicochemical properties of the particular polymer and solvent and/or other ingredients present in the casting solution, whereby pores are created. The foregoing cast membranes may then be coated, and optionally otherwise modified, as described elsewhere herein.

As mentioned above, the solvent- and pH-resistant membranes which are to be coated, comprise crosslinked acrylonitrile homo- and co-polymers, especially in the RO, UF and MF ranges, and include asymmetric and symmetric membranes. These polymers may be formed into membranes having a thickness of from about 10 microns to 10 mm., preferably from about 50 microns to about 500 microns, by casting alone or on a support, in any of the configurations as has already been described. Such polymeric membranes are subsequently subjected to crosslinking by a combination of chemical reactions and heating. In acrylonitrile copolymers, the proportion of acrylonitrile is preferably at least about 20%, more preferably at least about 50%, and most preferably at least about 85% by weight, of the total monomers. In place of acrylonitrile itself in these membrane-forming homo- and co-polymers, there may alternatively be used substituted acrylonitriles, e.g. $C_{1-6}$-alkylacrylonitriles such as methacrylonitrile and hexylacrylonitrile, arylacrylonitriles such as phenylacrylonitrile, haloacrylonitriles (in which halo signifies fluoro, chloro or bromo) such as fluoroacrylonitrile and chloroacrylonitrile, and thioacrylonitrile. Suitable comonomers which can be copolymerized with acrylonitriles and substituted acrylonitriles include monomers which may contain hydrophobic, hydrophilic, polar or ionic groups, especially, e.g., vinyl esters having 2 to 18 carbon atoms in the acid moiety, such as vinyl acetate; vinyl ethers having 3 to 12 carbon atoms; vinylpyridine; vinyl chloride; styrene; and acrylic and methacrylic acids and esters thereof having e.g. 1 to 4 carbon atoms in the ester moiety. Further suitable comonomers are maleic anhydride; 2-aminoethyl methacrylate; allyl compounds such as allyl alcohol, allyl- and methallyl-sulfonic acids and their salts (e.g. alkali metal salts), allyl and methallyl halides, allylamines and allyl p-toluenesulfonate. The term "acrylonitrile (or substituted acrylonitrile) copolymers" is intended to include such copolymers comprising more than 2 monomers, e.g. terpolymers such as acrylonitrile/styrene/butadiene ("ABS polymers"), acrylonitrile/methyl methacrylate/vinyl acetate and acrylonitrile/methyl methacrylate/sodium allylsulfonate, and quadripolymers. The substrate membrane may also be made from mixtures of acrylonitrile (or substituted acrylonitrile) homopolymers and/or copolymers.

The membrane derived from acrylonitrile (or substituted acrylonitrile) -derived polymers, once formed, is insolubilized by crosslinking, which may be effected with organic or inorganic bases, acids or free-radical initiators, followed by heating if necessary. Organic bases are preferably used for this purpose.

The term "organic bases" in this context includes amines, and in particular metal $C_{1-10}$ straight or branched chain alkoxides such as sodium or potassium methoxide, ethoxide, propoxide, isopropoxide, butoxide or tert.-butoxide. Also preferred are inorganic bases e.g. alkali metal hydroxides such as sodium or potassium hydroxide. In general, the metal alkoxides are utilized hydroxide. In general, the metal alkoxides are utilized in alcoholic medium, while the alkali metal hydroxides are utilized in aqueous medium. In either case, the concentrations of the bases may vary in the range of from about 0.01 to about 50%, preferably from about 0.05 to about 20%, wt./vol. Other utilizable inorganic bases are hydroxylamine, ammonia and alkali metal amides.

Thus, for example, the membrane may be immersed in a solution of a base such as sodium or potassium alkoxide, or NaOH or KOH, at a concentration of between about 0.05 and about 1.0% wt./vol. in methanol or ethanol, for the alkoxide bases, and between about 1 and about 20% wt./vol. for the hydroxide bases in water, for a time which lies between about 5 minutes and about 8 hours, preferably at a minimum temperature of about 15° C., most preferably at least about 30° C., and up to about the reflux temperature of the particular solvent used.

A person skilled in the art may readily determine the times required for treating the membrane with bases in order that the product will not swell to an undesirable extent when immersed in solvents such as dimethyl formamide (DMF) or 1-methylpyrrolidin-2-one (NMP); it is preferred that such swelling is no more than about 10%, more preferably no more than about 5%, and especially no more than about 2%. Following the treatment just described, the membrane is drained and heated at an elevated temperature, e.g. by placing in an oven at a temperature which is gradually raised from about 10° C. above room temperature to (e.g.) about 110° to about 130° C. (Alternatively, if the length of time at elevated temperature is kept below a determinable certain value, e.g. 15 minutes at 110° C., the elevated temperature need not be increased, without unduly reducing the flux of the resulting membrane.) The purpose of effecting at least some crosslinking prior to heating above the glass transition point of the membrane is to prevent plastic flow and closing of the membrane pore structure. While some closure may be tolerated and in fact be desirable, in order to improve rejection, this should not lower water flux below economically acceptable levels for the given application. The flux level is best controlled by crosslinking as much as possible before the step of heating at an elevated temperature, as described below.

After heating to (e.g.) about 110° to about 130° C., the membrane may be further insolubilized or crosslinked by heating (e.g. in air) in the region of about 250° C. for a time period of several minutes up to several hours, but this must be done carefully to prevent compaction. If desired, the membrane may be carbonized by heating in a non-reactive environment to (e.g.) approximately 600° to 1000° C. For this purpose, it is preferred that the membrane be in the form of hollow fibers or a planar membrane and supported by porous ceramic, carbon or metal tubelets or plates. Preferably, the crosslinking step may be carried out on a copolymer of polyacrylonitrile with acrylic acid or itaconic acid which are known to accelerate the crosslinking reaction.

Crosslinking the optionally substituted acrylonitrile-derived polymer of the membrane may alternatively be effected by use of organic or inorganic acids, including Lewis acids such as hydrogen halides (e.g. HBr), p-toluenesulfonic acid, stannic chloride, aluminum halides (e.g. the trichloride, tribromide or triiodide) and zinc chloride.

The inventive membranes may be used as flat or (preferably) tubular membranes in separation devices such as modules. They have superior rejection characteristics to organic compounds of low molecular weight, good flux properties, superior flexibility, and, in addition to stability in presence of solvents, high overall stability, such as in respect of resistance to compaction, and to chemical and/or biological degradation. They are particularly useful for the purpose of recovering organic compounds of low molecular weight from chemical reaction solutions or waste waters; the recovered compounds can then be re-used, or if desired, otherwise disposed of, especially if they are toxic or dangerous.

The pore protector layer, when present, and/or the final silicone layer, may, for example comprise at least one member selected from the group consisting of silanol-terminated polydimethylsiloxane, other silanol-terminated polysiloxanes, other hydroxy-terminated polysiloxanes, silicones containing alkyl groups, silicones containing aryl groups, and silicones containing both alkyl and aryl groups.

The separation effect (rejection) of the composite membranes according to the present invention can be measured as follows. A circular membrane with a surface area of 13 cm$^2$, resting on a sintered stainless steel disc, is used in a cylindrical cell made of stainless steel. 150 ml. of the solution (to be tested) which contains the solute to be tested in a concentration $C^1$ (g. solute/g. solution) are introduced onto the membrane in the steel cylinder and subjected to a pressure (N$_2$) of 14 bars. The solution is stirred magnetically. The concentration ($C^2$) of the liquid which collects on the outlet side of the membrane is determined, 3 samples of 5 ml. each being taken from the start of the experiment. In general, the amount which flows through the membrane and the composition of the 3 samples are constant. The rejection (R) can be calculated from the values obtained using the equation:

$$R(\%) = (C^1 - C^2) \times 100/C^1.$$

The amount of material (F=flux) passing through the membrane per surface and time unit is determined from the equation:

$$F = V \times S^{-1} \times t^{-1}$$

where V=volume, S=membrane surface area and t=time. F may be expressed in terms of cubic meters of solution per square meter surface area of membrane per day, or in terms of liters of solution per square meter surface area of membrane per hour.

In addition to measurements on flat membranes, measurements on tubular membranes 60 cm. long and with an outer diameter of 1.4 cm. were also carried out. For this purpose the tubular membranes were placed in a perforated tube made of stainless steel. The whole is then placed in a tube made of polycarbonate. The outflow from the membrane is between this outer polycarbonate tube and the steel tube. The liquid is added as a stream of solution in turbulent or laminar flow under pressure. The flow rate is kept constant at 10–15 liters per minute. The rejection (R) and the flux (F) are calculated in a similar manner as before. The invention will now be illustrated by the following non-limiting Examples.

EXAMPLE I

Polyacrylonitrile (98% homopolymer: DuPont A), MW (number average) 50,000, was dissolved in DMF and bob cast onto a tube of nonwoven polyester (1.27 cm diameter) and gelled in ice-water. After washing overnight, the substrate membrane had a 65% rejection to polyethylene glycol of 60K MW, and 5% rejection to sucrose. The polyacrylonitrile substrate was crosslinked by immersion for 5 minutes in 1% wt./vol. sodium ethoxide, drained and then heated to 115° C. for 30 minutes. The original substrate was off-white or beige, but after this treatment, it was dark brown, and no longer soluble or swellable in DMF, NMP or DMSO. While the original membrane had less than 18% rejection to raffinose, the crosslinked membrane had a rejection of 45% to raffinose and a 94% rejection to dextran 70K.

EXAMPLE II

The insolubilized membrane of Example I is immersed for 5 minutes in a solution of 0.5% silanol-terminated polydimethylsiloxane (MW 4200) in isopropanol, drained, heated at 50° C. for 30 minutes, immersed for 5 minutes in a solution of 0.5% polydimethylsiloxane (MW 36,000), 0.8% tetraethyl silicate and 2% tin octoate, and drained at room temperature for 72 hours. The final composite membrane had a rejection to 10% erythromycin in ethyl acetate of 99% and a flux under these conditions of 950 1/m$^2$.d.

EXAMPLE III

Crosslinked polyacrylonitrile substrate (unmodified) prepared as described in Example I was treated with a 10% solution of sodium hydroxide at 50° C. for 15 minutes, washed well with water, and heated 15 minutes at 110° C. and left in water overnight. The membrane is then coated as in Example II with both the pore protector and final coating. The final composite membrane had a rejection to 10% erythromycin in ethyl acetate of 99% and a flux under these conditions of 1000 1/m$^2$.d.

EXAMPLE IV

Example III was repeated using the following polyacrylonitrile materials for the substrate: (i) homopolyacrylonitrile MW 120,000; (ii) acrylonitrile/methacrylate copolymer (93:7); (iii) acrylonitrile/vinyl acetate copolymer (97:3). The resultant membranes were all insoluble in DMF. The membranes were is then coated as in Example II with both the pore protector and final coating. The final composite membrane had a rejection to 10% erythromycin in ethyl acetate of above 90%.

EXAMPLE V

Example III was repeated using silanol-terminated poly(phenylmethylsiloxane) instead of polydimethylsiloxane as the final silicone coating. The final composite membrane had a rejection to 10% erythromycin in ethyl acetate of 98%.

EXAMPLE VI

Example II was repeated, except that the treatment with silanol-terminated polydimethylsiloxane, MW 4200 (the pore protector) was omitted. The product membrane had a rejection to 10% erythromycin in ethyl acetate of 90% and a flux under these conditions of 2500 1/m$^2$.d.

While presently preferred modes of operating the invention have been particularly described, it will be evident to those skilled in the art that many modifications and variations are possible. Thus, the invention is not to be construed as limited by the particularly described modes of operation, rather its spirit and scope are to be understood with reference to the claims which follow.

We claim:

1. A process for the at least partial physical separation of the components of a liquid phase mixture of components, which process comprises the steps of:
   contacting said liquid phase mixture under a superatmospheric pressure greater than the osmotic pressure with a composite membrane comprising a substrate made from a polymer selected from copolymers and homopolymers of ethylenically unsaturated nitriles, which substrate has been coated with a silicone, and the silicone coating has been crosslinked; and recovering the thus treated said liquid phase mixture in the form of at least one effluent which differs in composition from the untreated said liquid phase mixture.

2. A process according to claim 1, wherein said substrate has first been treated with a pore protector in absence of curing agents and catalysts therefor, prior to application of the silicone coating which is crosslinked.

3. A process according to claim 2, wherein at least one of said silicone coating and said pore protector comprises at least one member selected from the group consisting of silanol-terminated polydimethylsiloxane, other silanol-terminated polysiloxanes, other hydroxy-terminated polysiloxanes, silicones containing alkyl groups, silicones containing aryl groups, and silicones containing both alkyl and aryl groups.

4. A process according to claim 1, wherein said silicone coating comprises at least one member selected from the group consisting of silanol-terminated polydimethylsiloxane, other silanol-terminated polysiloxanes, other hydroxy-terminated polysiloxanes, silicones containing alkyl groups, silicones containing aryl groups, and silicones containing both alkyl and aryl groups.

5. A process according to claim 1, wherein said substrate is self-supporting.

6. A process according to claim 1, wherein said substrate is supported on another porous material.

7. A process according to claim 1, wherein said composite membrane is substantially insoluble in the following solvents, namely, acetonitrile, ethanol, hexane, toluene, N-methylpyrrolidone, dimethylsulfoxide, dimethylformamide, dimethylacetamide, mixtures thereof with each other, and mixtures of any of the foregoing with water.

8. A process according to claim 7, wherein said composite membrane swells to an extent of no more than about 10% when immersed in said solvent.

9. A process according to claim 1, wherein said ethylenically unsaturated nitriles are selected from the group consisting of acrylonitrile and substituted acrylonitriles.

10. A process according to claim 1, wherein said composite membrane is substantially insoluble in the following solvents, namely, acetonitrile, ethanol, hexane, toluene, N-methylpyrrolidone, dimethylsulfoxide, dimethylformamide, dimethylacetamide, mixtures thereof with each other, and mixtures of any of the foregoing with water, and which composite membrane comprises a substrate made from a polymer selected from copolymers and homopolymers of ethylenically unsaturated nitriles, which substrate has been subjected to a stepwise treatment sequence comprising the steps of: (1) insolubilizing said polymer by crosslinking; (2) coating with a silicone layer; and (3) crosslinking the silicone layer.

11. A process according to claim 10, wherein prior to step (2), the crosslinked insolubilized substrate obtained in step (1) has been treated with a pore protector in absence of curing agents and catalysts therefor.

12. A process according to claim 11, wherein at least one of said silicone coating and said pore protector comprises at least one member selected from the group consisting of silanol-terminated polydimethylsiloxane, other silanol-terminated polysiloxanes, other hydroxy-terminated polysiloxanes, silicones containing alkyl groups, silicones containing aryl groups, and silicones containing both alkyl and aryl groups.

13. A process according to claim 11, wherein at least one of said silicone coating and said pore protector comprises at least one member selected from the group consisting of silicones containing fluorine-substituted alkyl groups, silicones containing fluorine-substituted aryl groups, and silicones containing both alkyl and aryl groups wherein either the alkyl groups or the aryl groups, or both the alkyl and aryl groups, are at least partly fluorine-substituted.

14. A process according to claim 11, wherein at least one of said silicone coating and said pore protector comprises poly(trifluoropropylmethylsiloxane).

15. A process according to claim 10, wherein said silicone coating comprises at least one member selected from the group consisting of silanol-terminated polydimethylsiloxane, other silanol-terminated polysiloxanes, other hydroxy-terminated polysiloxanes, silicones containing alkyl groups, silicones containing aryl groups, and silicones containing both alkyl and aryl groups.

16. A process according to claim 10, wherein said substrate is self-supporting.

17. A process according to claim 10, wherein said substrate is supported on another porous material.

18. A process according to claim 10, wherein said composite membrane swells to an extent of no more than about 10% when immersed in said solvent.

19. A process according to claim 10, wherein said ethylenically unsaturated nitriles are selected from the group consisting of acrylonitrile and substituted acrylonitriles.

20. A process according to claim 10, wherein said insolubilizing step comprises treatment with at least one base selected from organic and inorganic bases.

21. A process according to claim 20, wherein subsequent to said treatment with at least one base, said substrate is subjected to a heat-treatment sub-step at elevated temperature.

22. A process according to claim 10, wherein said silicone coating comprises at least one member selected from the group consisting of silicones containing fluorine-substituted alkyl groups, silicones containing fluorine-substituted aryl groups, and silicones containing both alkyl and aryl groups wherein either the alkyl groups or the aryl groups, or both the alkyl and aryl groups, are at least partly fluorine-substituted.

23. A process according to claim 10, wherein said silicone coating comprises poly(trifluoropropylmethylsiloxane).

24. A process according to claim 1, wherein said composite membrane comprises a substrate made from polyacrylonitrile, which substrate has been subjected to a stepwise treatment sequence comprising the steps of:

(1) insolubilizing said polymer by crosslinking, comprising treatment with a base selected from organic and inorganic bases, the base-treated polyacrylonitrile substrate then being subjected to a heat-treatment sub-step at the temperature within the range of about 110°-130° C.;

(2) treating the insolubilized polymer with a silanol-terminated polysiloxane pore protector in absence of curing agents and catalysts therefor; and (3) coating the pore-protected substrate with a silicone layer.

25. A process according to claim 24, wherein at least one of said silicone coating and said pore protector comprises at least one member selected from the group consisting of silicones containing fluorine-substituted alkyl groups, silicones containing fluorine-substituted aryl groups, and silicones containing both alkyl and aryl groups wherein either the alkyl groups or the aryl groups, or both the alkyl and aryl groups, are at least partly fluorine-substituted.

26. A process according to claim 24, wherein at least one of said silicone coating and said pore protector comprises poly(trifluoropropylmethylsiloxane).

27. A process according to claim 1, wherein said liquid phase mixture of components comprises at least one solute selected from the group consisting of dyes, dye intermediates, optical brighteners, antibiotics, peptides, proteins, enzymes, hormones, and herbicides, together with at least one solvent selected from the group consisting of organic solvents and aqueous/organic solvent mixtures.

28. A process according to claim 1, wherein said liquid phase mixture of components comprises a lubricating oil dissolved in at least one organic solvent.

29. A process according to claim 1, wherein said liquid phase mixture of components comprises at least one catalyst dissolved in at least one organic solvent.

30. A process according to claim 1, wherein said liquid phase mixture of components comprises at least one metal organic complex catalyst dissolved in at least one organic solvent.

31. A process according to claim 1, wherein said liquid phase mixture of components comprises at least one paint waste comprising low molecular weight oligomers in at least one organic solvent.

32. A process for at least partial physical separation of the components of a liquid phase mixture of components, which process comprises the steps of:

contacting said liquid phase mixture under a superatmospheric pressure greater thant the osmotic pressure with a composite membrane comprising a substrate made from a polymer selected from copolymers and homopolymers of ethylenically unsaturated nitriles, which substrate has been coated with a crosslinkable coating which has been subsequently crosslinked, said crosslinked coating being such that said composite membrane is substantially insoluble in the following solvents, namely, acetonitrile, ethanol, hexane, toluene, N-methylpyrrolidone, dimethylsulfoxide, dimethylformamide, dimethylacetamide, mixtures thereof with each other, and mixtures of any of the foregoing with water; and recovering the thus treated said liquid phase mixture in the form of at least one effluent which differs in composition from the untreated said liquid phase mixture.

33. A process according to claim 32, wherein said liquid phase mixture of components comprises at least one solute selected from the group consisting of dyes, dye intermediates, optical brighteners, antibiotics, peptides, proteins, enzymes, hormones, and herbicides, together with at least one solvent selected from the group consisting of organic solvents and aqueous/organic solvent mixtures.

34. A process according to claim 32, wherein said liquid phase mixture of components comprises a lubricating oil dissolved in at least one organic solvent.

35. A process according to claim 32, wherein said liquid phase mixture of components comprises at least one catalyst dissolved in at least one organic solvent.

36. A process according to claim 32, wherein said liquid phase mixture of components comprises at least one metal organic complex catalyst dissolved in at least one organic solvent.

37. A process according to claim 32, wherein said liquid phase mixture of components comprises at least one paint waste comprising low molecular weight oligomers in at least one organic solvent.

* * * * *